United States Patent

Moss et al.

[11] Patent Number: 5,667,170
[45] Date of Patent: Sep. 16, 1997

[54] POD MOUNTED REFUELING SYSTEM

[75] Inventors: William Gregory Moss, Centerville; Kenneth Dale Roberts, Xenia; Charles Whitford Briggs, Waynesville, all of Ohio

[73] Assignee: Tracor Flight Systems, Inc., Austin, Tex.

[21] Appl. No.: 350,787

[22] Filed: Dec. 7, 1994

[51] Int. Cl.⁶ .......... B64D 39/02; B64D 37/04; B64D 37/06; B64C 39/08
[52] U.S. Cl. .......... 244/135 A; 244/136; 244/45 R
[58] Field of Search .......... 244/135 R, 135 A, 244/136, 45 R

[56] References Cited

U.S. PATENT DOCUMENTS

| | | | |
|---|---|---|---|
| 1,728,449 | 9/1929 | Procofieff-Seversky | 244/135 R |
| 1,806,833 | 5/1931 | Ullendorff | 244/135 R |
| 1,806,834 | 5/1931 | Ullendorff | 244/135 R |
| 1,818,834 | 8/1931 | Zimmerman | 244/135 R |
| 2,124,867 | 7/1938 | Akerman | 244/135 |
| 2,582,609 | 1/1952 | Steele | 244/135 |
| 2,596,455 | 5/1952 | Williams et al. | 244/135 |
| 2,663,523 | 12/1953 | Leisy | 244/135 |
| 2,692,102 | 10/1954 | Cobham et al. | 244/135 |
| 2,772,061 | 11/1956 | Sellers | 244/136 |
| 2,774,547 | 12/1956 | Latimer-Needham et al. | 242/86 |
| 2,793,828 | 5/1957 | Rohtert | 244/135 |
| 2,859,002 | 11/1958 | Leisy | 244/3 |
| 2,879,017 | 3/1959 | Smith | 244/135 |
| 2,953,332 | 9/1960 | Cobham et al. | 244/135 |
| 2,960,295 | 11/1960 | Schulze | 244/135 |
| 2,984,439 | 5/1961 | Fletcher | 244/135 R |
| 3,008,674 | 11/1961 | Abraham | 244/135 |
| 3,055,620 | 9/1962 | Weiland | 244/135 A |
| 3,061,246 | 10/1962 | Kirby | 244/135 |
| 3,091,419 | 5/1963 | Mosher | 244/135 |
| 3,533,582 | 10/1970 | Roth | 244/136 |
| 3,674,049 | 7/1972 | Macgregor | 137/355.2 |
| 4,072,283 | 2/1978 | Weiland | 244/135 |
| 4,129,270 | 12/1978 | Robinson et al. | 244/135 A |
| 4,231,536 | 11/1980 | Ishimitsu et al. | 244/135 A |
| 4,327,784 | 5/1982 | Denniston | 141/387 |
| 4,441,673 | 4/1984 | Muscatell | 244/135 R |
| 4,586,683 | 5/1986 | Kerker | 244/135 A |
| 4,790,350 | 12/1988 | Arnold | 244/135 R |
| 4,905,937 | 3/1990 | Spotswood et al. | 244/137.4 |
| 4,948,070 | 8/1990 | Lyman | 244/135 R |
| 5,141,178 | 8/1992 | Alden et al. | 244/135 A |
| 5,188,313 | 2/1993 | Piasecki | 244/3 |
| 5,499,789 | 3/1996 | Crabere et al. | 244/135 R |

FOREIGN PATENT DOCUMENTS

| | | |
|---|---|---|
| 369228 | 3/1932 | United Kingdom . |
| 822819 | 11/1959 | United Kingdom . |

OTHER PUBLICATIONS

*Theory of Wing Sections Including a Summary of Airfoil Data*, Ira H. Abbott and Albert E. Von Doenoff, 1949.

*Primary Examiner*—Andres Kashnikow
*Assistant Examiner*—Virna Lissi Mojica
*Attorney, Agent, or Firm*—Seidel, Gonda & Lavorgna & Monaco, PC

[57] ABSTRACT

A refueling system mounted to an aircraft fuselage for transferring fuel from a tanker aircraft to a receiver aircraft. The refueling system including a pylon extending from the fuselage at a position aft of the main wing and having a refueling pod mounted thereto at an outboard location. A refueling hose is disposed within and extendable from the refueling pod and functions to transfer fuel from the refueling pod to the receiver aircraft. A means for transferring fuel from a fuel source, located within the aircraft, to the refueling hose is also provided. The pylon and refueling pod are configured so as to channel the refueling hose in a preferred direction to maximize safety during refueling. The channeling of the refueling hose is accomplished by mounting the refueling pod at an angle to the pylon, mounting the refueling pod at an angle to a horizontal plane, mounting the pylon at angle to the fuselage, or a combination of these mounting arrangements. The pylons are preferably supported by a sandwich-type reinforcement of the fuselage floor between the pylons.

26 Claims, 10 Drawing Sheets

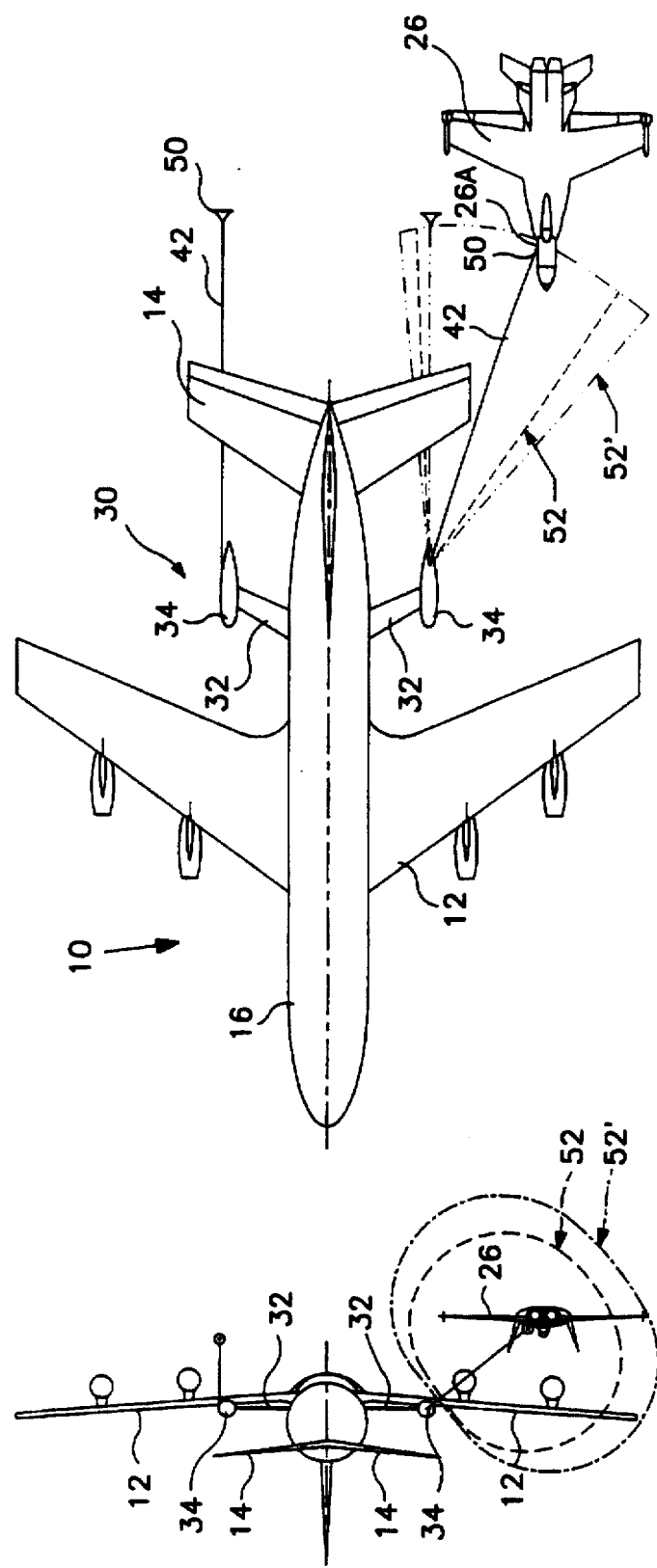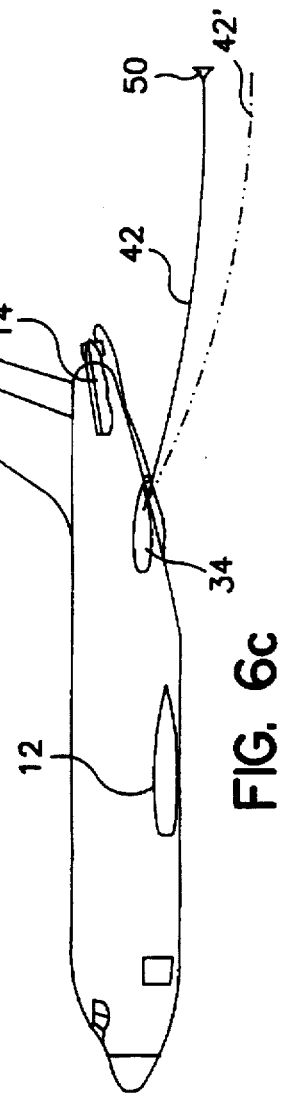
FIG. 6b
FIG. 6c
FIG. 6a

POD MOUNTED REFUELING SYSTEM

FIELD OF THE INVENTION

The invention relates to aircraft in-flight refueling systems and, more particularly, to a refueling system which is extended from the fuselage of an aircraft by a pylon mounted aft of the main wing, the refueling system being of the type which has a refueling hose that extends from a pod for transferring fuel to a receiving aircraft.

BACKGROUND OF THE INVENTION

Aerial refueling is a common method for extending the flight time and range of an aircraft and typically involves a tanker aircraft, which is loaded with excess fuel, transferring fuel to one or more trailing or receiver aircraft. Several types of in-flight refueling systems have emerged over the years.

One type of refueling system is the boom type disclosed in U.S. Pat. No. 2,663,523. A rigid refueling boom mounted below the tail extends outward from the belly of the tanker and is controlled by an operator located within the tanker. The receiver aircraft positions behind the tanker, permitting the operator on the tanker to direct the end of the boom into the refueling port on the receiver aircraft and to initiate refueling.

An alternate type of refueling system is disclosed in U.S. Pat. No. 3,008,674. The system incorporates a detachable refueling pod which is mounted below the main wing of the aircraft. A hose extends from the aft portion of the pod and has a drogue attached to its trailing end which stabilizes the hose in the air stream and thereby facilitates interconnection by the receiving aircraft. By mounting a pod under each wing, two receiving aircraft can refuel at the same time from opposite sides of the tanker. Additionally, mounting the pod under the wing permits the refueling hose and drogue to trail behind the aircraft, lowering the likelihood that the hose or drogue will impact the fuselage or tail.

One drawback to a wing-mounted refueling pod is that the weight of the pod produces high bending loads in the wing. Consequently, substantial structural modifications must be made to the wing to accommodate the increased loads. The increased bending of the wings caused by the pods tends to reduce the fatigue life of the wing. Furthermore, the location of the pods on the wings produces an excessive amount of drag, which reduces the fuel efficiency of the tanker aircraft.

Another deficiency with the wing-mounted refueling pods is the difficulty that the receiver aircraft sometimes encounters when attempting to engage with the drogue. Referring to FIG. 1a, a rear view of a tanker aircraft 10 is shown which includes a main wing 12, a stabilizer 14, a fuselage 16 and engines 18. Also shown is a wing-mounted refueling pod 20 with a refueling hose 22 extended therefrom and a drogue 24 attached to the trailing end of the hose. A receiver aircraft 26 is depicted approaching the tanker aircraft for in-flight refueling. In order to transfer fuel from the tanker aircraft to the receiver aircraft, the drogue must connect with a probe or refueling port on the receiver aircraft. In a wing-mounted refueling system, the tanker aircraft has no control over the motion of the drogue and refueling hose and, therefore, the drogue is free to travel +/−30 degrees above, below and to the sides of the wing. Hence, in order for the receiver aircraft to engage with the drogue, it must be maneuvered in such a manner so as to track or chase the motions of the drogue.

The situation is further complicated by the airflow over the wing. As shown in FIG. 1b, the airflow over the wing tends to drive the refueling hose 22 and drogue 24 towards the fuselage 16. Accordingly, the receiver aircraft 26 must maneuver in the direction of the drogue 24. As the receiver aircraft 26 approaches the fuselage 16 the exhaust from the engines 18 (indicated in FIG. 1c by numeral 28) causes the receiver aircraft 26 to veer to the left, driving it outboard. As the receiver aircraft 26 approaches the outer tip of the wing 12, the wing tip vortices, generated by the turbulent air flow around the wing tip, depicted by numeral 29 in FIG. 1d, force the receiver aircraft 26 to veer back to the right. This procedure continues until the receiver aircraft 26 finally engages with the refueling hose 22 and drogue 24. It is common to make several attempts before the receiver aircraft 26 engages with the refueling hose 22 and drogue 24. Accordingly, in-flight refueling from a wing-mounted system can be an extremely difficult and dangerous undertaking.

In an attempt to reduce the difficulty associated with in-flight refueling, drogue configurations, such as the type shown in U.S. Pat. No. 2,596,455, have been created which attempt to maintain the refueling hose in a relatively stable flight path. These configurations, however, have not proven satisfactory.

A need therefore exists for an improved refueling system which permits a receiver aircraft to easily and safely engage with a drogue and refueling hose, and which system minimizes the drag and bending loads imposed on the tanker aircraft.

SUMMARY OF THE INVENTION

It is an object of the present invention to provide a refueling system mounted aft of the main wing which reduces the effect of wing tip vortices and engine exhaust on a refueling operation.

Another object of the present invention is to provide a refueling system which imposes minimal drag, lift and bending loads on a tanker aircraft.

Yet another object of the present invention is to provide a refueling system which minimizes the likelihood of a receiver aircraft contacting the fuselage of a tanker aircraft.

Still yet another object of the present invention is to provide a refueling system which is easily mounted to and removable from a tanker aircraft with minimal structural modifications.

These and other objects are provided by the refueling system of the present invention which is mounted to an aircraft fuselage. The aircraft includes a main wing extending from opposite sides of the fuselage, and a stabilizer mounted aft of the main wing and also extending from opposite sides of the fuselage. A fuel source is located within the aircraft and contains fuel for transfer to a receiver aircraft. The refueling system of the present invention comprises a pylon extending from the fuselage at a position aft of the main wing with a refueling pod mounted to the pylon at an outboard location. A refueling hose is disposed within and extendable from the refueling pod and functions to transfer fuel from the refueling pod to the receiver aircraft. A means for transferring fuel from the fuel source to the refueling hose is also provided.

The refueling system preferably includes two removably mounted aerodynamic pylons and refueling pods extending from opposite sides of the fuselage forward of the horizontal stabilizer. The pylons are preferably symmetric in cross-section to facilitate interchangeability.

The pylon and refueling pod are configured to channel the refueling hose in a preferred direction so as to minimize contact with the aircraft fuselage while maintaining a relatively large refueling envelope. The channeling provided by the present invention can be accomplished by mounting the refueling pod at an angle to the pylon, mounting the refueling pod at an angle to a horizontal plane, mounting the pylon at angle to the fuselage, or a combination of these mounting arrangements. In the preferred embodiment the refueling hose is channeled at an angle of 30 degrees to the horizontal plane and is 15 degrees to the longitudinal axis of the refueling pod.

Also contemplated by the present invention is an aircraft capable of dispensing fuel in-flight which includes a fuselage with a main wing and stabilizer extending therefrom. A pylon extends from the fuselage, aft of the main wing, and has a refueling pod mounted thereto. A refueling hose is disposed within the pod and is connected to a fuel source, located within the aircraft, by a fuel transferring means. A means for supporting the pylon is provided which preferably includes a sandwich-type reinforced floor in the fuselage and mounting lugs extending from the fuselage to which the pylon is mounted.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 6a is a rear view of the refueling system of the present invention during an in-flight refueling operation.

FIG. 6b is a top view of the refueling system of the present invention during an in-flight refueling operation.

FIG. 6c is a side view of the refueling system of the present invention during an in-flight refueling operation.

DETAILED DESCRIPTION OF THE DRAWINGS

Figure 1A:
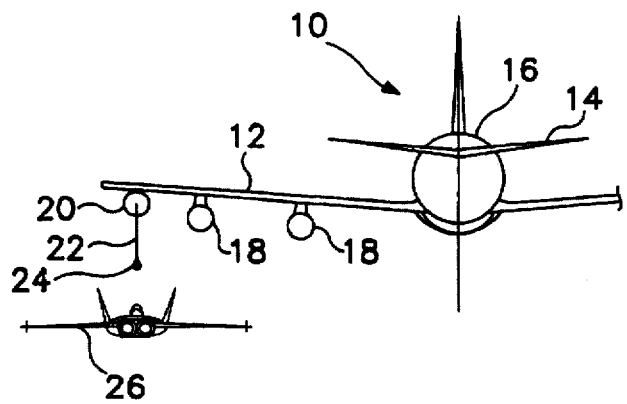
FIGS. 1a–1d illustrate a rear view of a wing-mounted refueling operation wherein a receiver aircraft is attempting to engage with a refueling hose on a tanker aircraft.
Figure 1B:
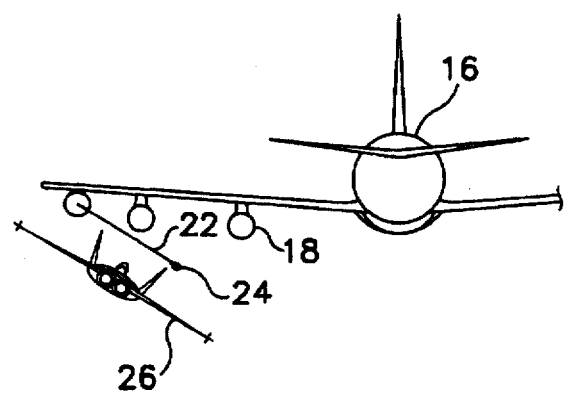
Figure 1C:
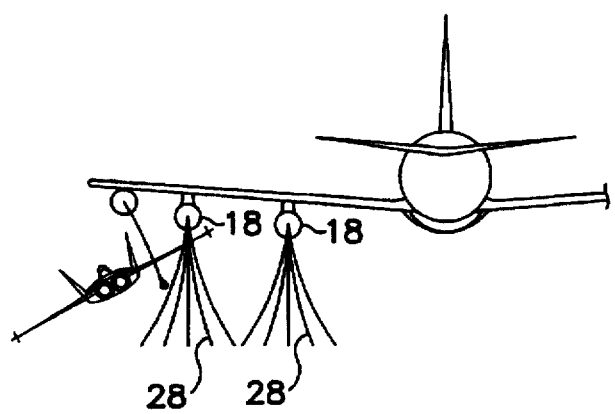
Figure 1D:
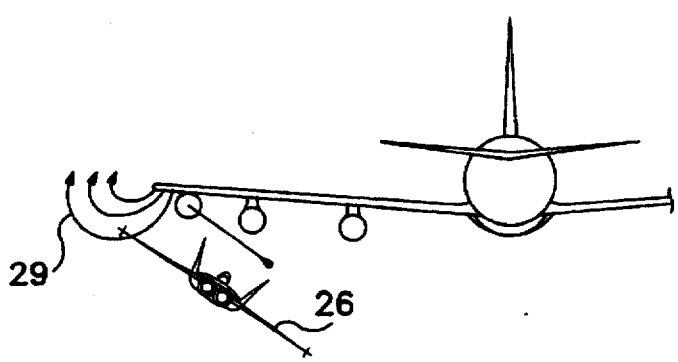
Figures 2A, 2B, 2C:
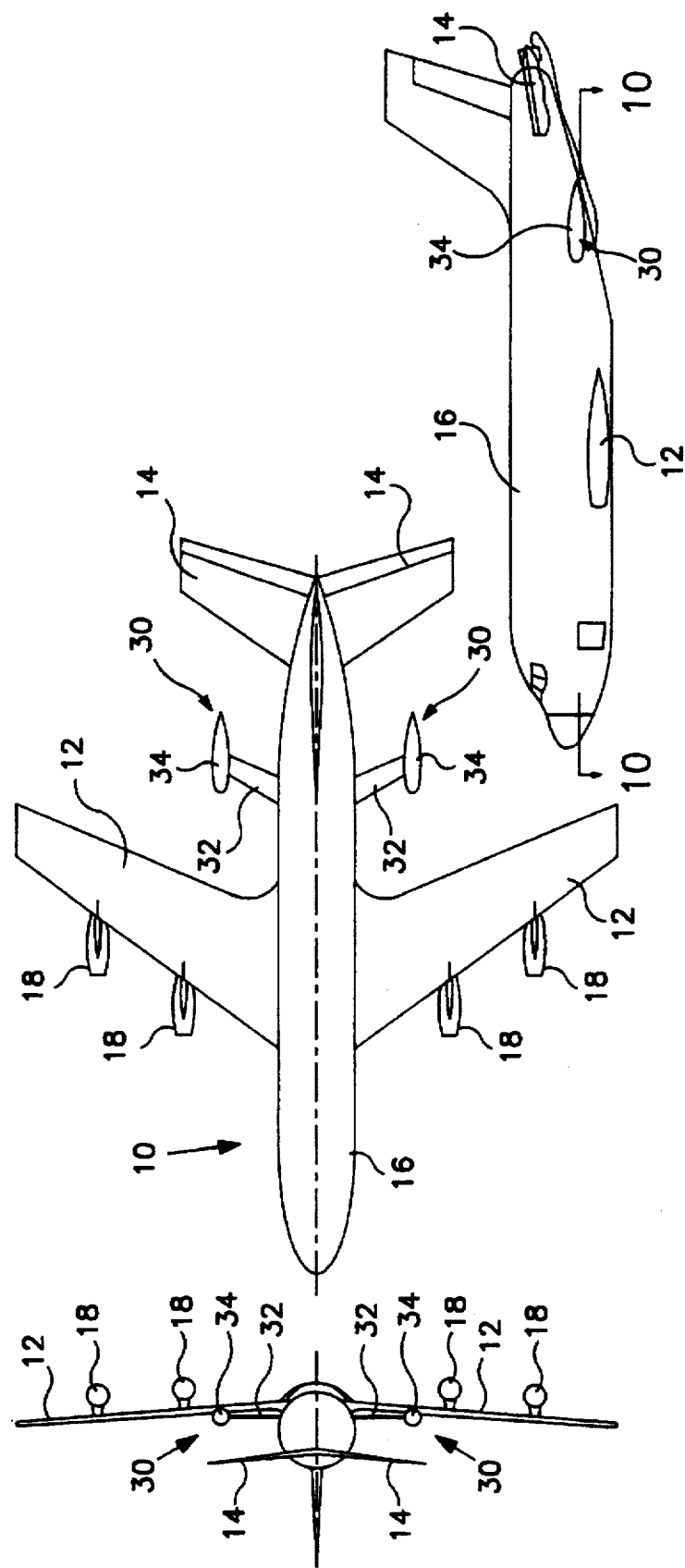
FIG. 2a is a rear view of the refueling system of the present invention mounted on a tanker aircraft.
FIG. 2b is a top view of the refueling system of the present invention mounted on a tanker aircraft.
FIG. 2c is a side view of the refueling system of the present invention mounted on a tanker aircraft.

Referring to FIGS. 2a–2c, a tanker aircraft 10 is shown with a main wing 12, a stabilizer 14, a fuselage 16 and engines 18. The tanker aircraft 10 illustrated in the accompanying figures is a KC-135R type aircraft. However, it should be understood that the invention is by no means limited to a specific aircraft type or model. The refueling system 30 of the present invention is shown mounted to the fuselage 16 at a location aft of the main wing 12. Furthermore, for the purpose of illustrating the preferred embodiment, the refueling system 30 is shown mounted forward of and below the stabilizer 14.

The refueling system 30 includes at least one pylon 32 which extends from and is mounted to the fuselage 16. Attached to the pylon, outboard of the fuselage skin, is at least one refueling pod 34. In the preferred embodiment shown in FIGS. 2a–2c, there are two pylons 32 disposed on opposite sides of the fuselage, each pylon extending laterally outward approximately ten feet from the fuselage. Each pylon has attached to its outermost tip one refueling pod 34. As will be discussed in more detail hereinbelow, the length of the pylon 32 and the location and orientation of the pylon 32 and refueling pod 34 are determined so as to minimize the likelihood that the refueling hose will contact the fuselage, the amount of disturbing airflow imposed on the receiving aircraft, and the drag on the tanker aircraft caused by the refueling system 30.

The pylon 32 is designed to direct the airflow over the pylon in a prescribed manner so as to minimize lift and drag. Many factors have an influence on the lift/drag characteristics of the pylon 32, some of which are the aerodynamic profile (airfoil), the angle of attack of the airfoil (angle with respect to the direction of flight), the aspect ratio (pylon length versus width), the taper of the pylon (reduction in cross-sectional thickness or width from tip to root), the dihedral angle of the pylon with respect to the fuselage, and the sweep of the pylon (the angle at which the pylon is swept aftward).

Figure 3A:
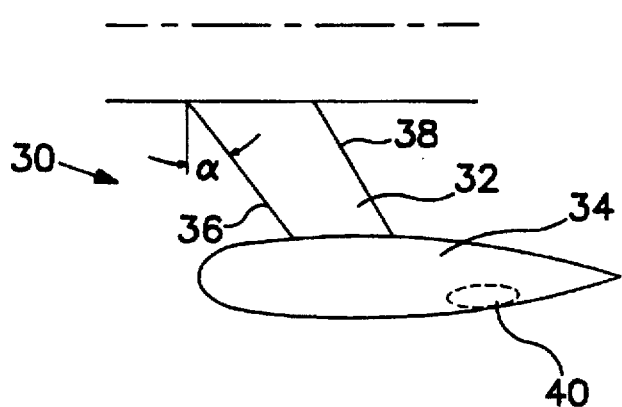
FIG. 3a is a detail plan view of the refueling system of the present invention mounted on a portion of a tanker aircraft.
Figure 3B:
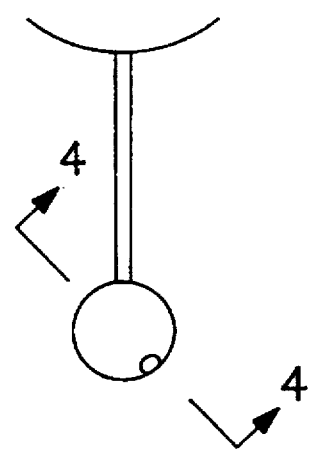
FIG. 3b is a detail side view of the refueling system of the present invention mounted on a portion of a tanker aircraft.

FIGS. 3a and 3b show a detail view of the refueling system 30. The pylon 32 has a leading edge 36 and a trailing edge 38. The leading edge 36 is shown with an aft sweep at an angle α. The sweep of the pylon 32 changes the compressibility, lift and stall characteristics of the pylon 32. Angle α is chosen between about 0 degrees and about 80 degrees and preferably is between about 20 degrees and about 45 degrees. In the most preferred embodiment of the invention, the leading edge 36 of the pylon 32 is swept aft at a sweep angle α of approximately 34 degrees. While many factors can influence the choice of sweep angle α, it is generally desirable to choose an angle α which is similar to the sweep of the main wing. This relationship typically results in a pylon drag performance which is acceptable in the design envelope for the aircraft.

The cross-section of the pylon 32 is also chosen with reduced drag and lift, thereby minimizing the required flight control adjustments that must be made to the aircraft, e.g., minimal elevator adjustments. In the preferred embodiment, NACA airfoil 0010-35 has been chosen for the pylon cross-section. NACA refers to a numerical system, originated by the National Advisory Committee for Aeronautics, which designates specific airfoil profiles. The NACA numerical system, in general, and the NACA 0010-35 airfoil, in particular, are discussed in the *Theory of Wing Sections*, by Ira H. Abbott and Alfred E. Von Doenhoff, 1959, and is incorporated herein by reference. The NACA 0010-35 airfoil provides low drag during straight and level flight, low lift at angle of attack, and low compressible drag at high Mach. The NACA 0010-35 airfoil has a symmetric cross-section which permits the pylons to be designed so as to be interchangeable from one side of the aircraft to the other (i.e., port side to starboard side and vice-versa). The width of the airfoil (leading edge to trailing edge) is preferably eighty inches with a maximum thickness of eight inches. Those skilled in the art will appreciate that a variety of other widths, thicknesses, and airfoil profiles may be interchanged without detracting from the invention. The contour of the pylon airfoil is designed to generate a relatively smooth air flow, thereby minimizing any disturbing effects on a receiver aircraft 26.

As discussed above, the refueling pod 34 is attached to the tip of the pylon 32 and, preferably, has an aerodynamic shape which minimizes drag. The size and shape of the refueling pod 42 are generally governed by the refueling equipment located within the pod (e.g., amount of refueling hose, electrical, hydraulic and fuel controls, etc.). The refueling pod 34 has an exit port 40 formed thereon which is shown in more detail in FIG. 4. The exit port 40 is operative in channeling a refueling hose 42 and drogue (not shown) in a prescribed direction during extension. The direction of channeling is shown at an angle β from the longitudinal axis of the refueling pod 34.

Figure 5:
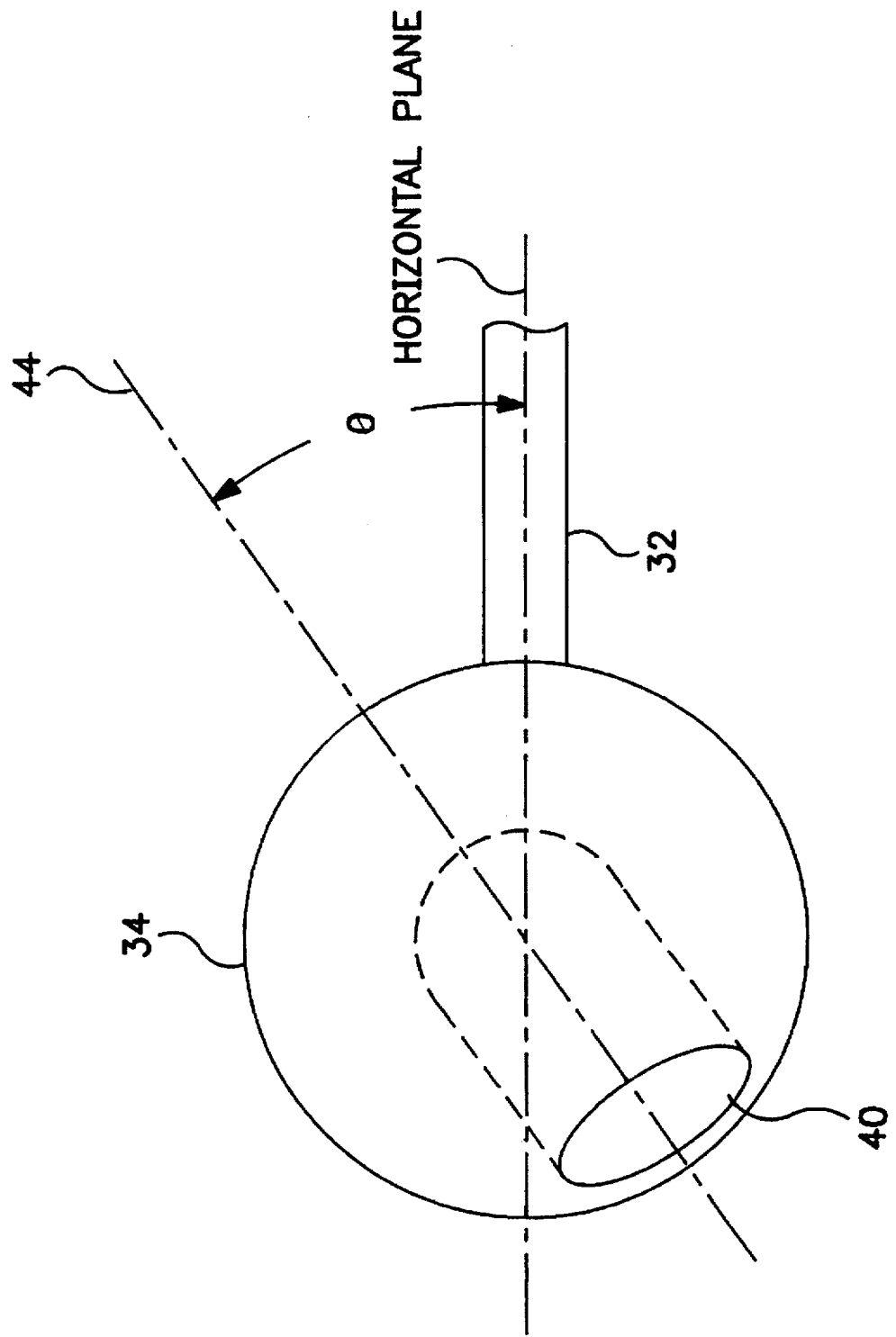
FIG. 5 is a rear view of the refueling pod of the present invention taken along lines 5—5 of FIG. 4.

Referring now to FIG. 5, the exit port 40 also forms an angle θ with respect to a horizontal plane. That is, the attachment of the refueling pod 34 to the pylon 32 and/or the pylon 32 to the fuselage 16 are configured to position the exit port so as to channel the refueling hose 42 along a plane 44 which is at an angle θ with respect to the horizontal plane. For example, the refueling pod 34 could be mounted on the pylon 32 so as to position the exit port 40 along a plane which is θ degrees from the horizontal. Alternately, the pylon 32 could be mounted to the fuselage 18 with an angle which, in turn, results in the exit port 40 being positioned along a plane that is at an angle θ with respect to the horizontal plane. That is, the pylon 32 may be mounted to the fuselage 18 with a negative dihedral angle with respect to the horizontal plane, as will be discussed in more detail below. In yet still another embodiment, a portion of the pylon 32 can be formed with a dihedral angle with respect to the remainder of the pylon 32, e.g., a portion of the pylon 32 is horizontal and a portion of the pylon 32 is at a dihedral angle. These configurations could result in the refueling pod 34 being positioned above, below, and/or at an angle to the pylon 32. Those skilled in the art will understand that various additional embodiments, including combinations of the above embodiments, may also be utilized without detracting from the scope of the invention.

The angles β and θ will vary depending on several factors, such as, but not limited to, the location of the refueling pod with respect to the stabilizer and fuselage, the angle of attack of the pylon, and the orientation of the refueling pod on the pylon. Additionally, the responsiveness (i.e., ability to operate efficiently) of the hose reel 48 has an impact on the choice of angle β. More specifically, the hose reel 48 is normally capable of operating (e.g., extending and retracting the refueling hose 42) efficiently in a 30° cone or zone around the exit port 40. Any larger angle adversely affects the reeling capability of the hose reel 48. In order to maximize the refueling envelope, the exit port 40 is preferably positioned so as to result in the refueling hose 42 and drogue trailing near the inside of the refueling envelope. This position of the refueling hose allows the receiver aircraft 26, after engaging with the drogue, to move a significant distance away from the tanker aircraft 10, without compromising the responsiveness of the hose reel 48. These and other factors have an effect on the preferred direction in which the refueling hose 42 should extend from the refueling pod 34 so as to minimize the likelihood of contact with the tanker aircraft 10, minimize drag, maximize the distance of the receiving aircraft 26 from the tanker aircraft 10 and from other receiver aircraft, and maximize the operational refueling envelope.

Angle β, at which the exit port 40 channels the refueling hose 42 with respect to the longitudinal axis of the refueling pod 34, is preferably selected between about 0 degrees and about 90 degrees. The more preferable range for angle β is between about 5 degrees and about 30 degrees. Angle θ, which defines the plane 44 with respect to the horizontal plane along which the exit port 40 channels the refueling hose 42, is preferably selected from between about 0 degrees and about 90 degrees. The more preferable range for angle θ is between about 10 degrees and about 40 degrees. In the preferred embodiment of the invention illustrated in the figures, angle β is about 15 degrees and angle θ is about 30 degrees.

Figure 4:
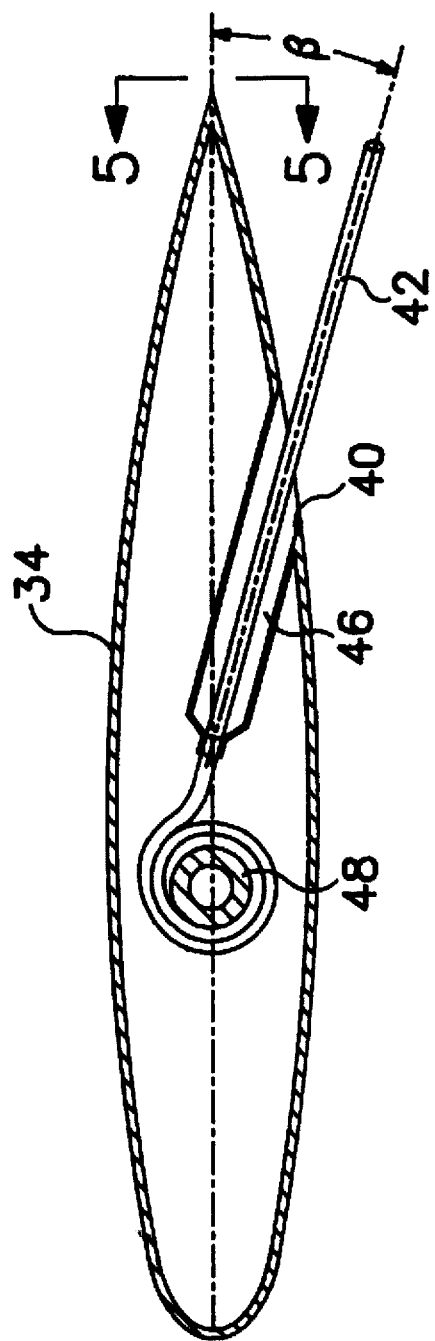
FIG. 4 is a cross-sectional view of the refueling pod of the present invention taken along lines 4—4 of FIG. 3.

Referring back to FIG. 4, the exit port 40 also includes a chamber 46 which is larger then the diameter of the refueling hose 42 and is designed to receive the drogue (not shown) during storage. Also shown in FIG. 4 is the refueling hose 42 wrapped around the hose reel 48. The hose reel 48 is designed to spool the refueling hose 42 during storage. The hose reel 48, in turn, is attached to and rotated by a driving mechanism (not shown) which extends the hose out of and retracts the hose into the refueling pod 34. The type of driving mechanism chosen is not critical to the invention and, therefore, need not be described. While the hose reel 48 is illustrated as being located in the refueling pod 34, it is also possible to position the hose reel 48, or similar type reeling mechanism, within the pylon 32, provided that enough room is available to accommodate the length of refueling hose 42 (e.g., 90 feet). Furthermore, it is also possible to position the exit port 40 in the pylon 32 for directing the refueling hose 42 in the preferred direction.

Figure 10:
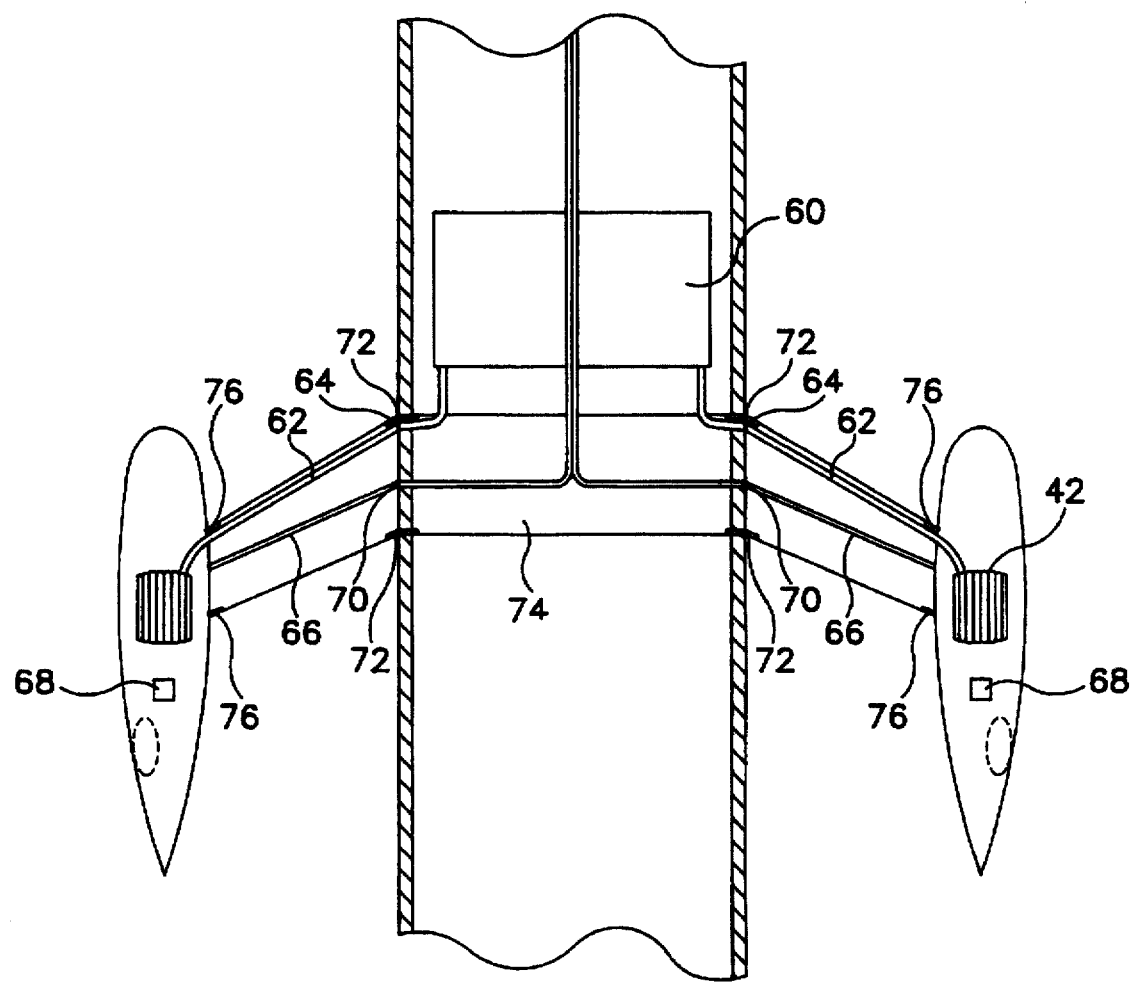
FIG. 10 is a cross-sectional view of a portion of the fuselage taken along line 10—10 in FIG. 2c.

Referring now to FIG. 10, a partial section view of the fuselage 16 is illustrated. The refueling hose 42 is connected to a fuel source 60 which is located within the tanker aircraft 10. The connection between the fuel source 60 and the refueling hose 42 may comprise a series of fuel lines 62 and pumps (not shown) which provide fluidic communication between the two. The fuel lines 62 are preferably routed through the forward portion of the pylon 32 and refueling pod 34 and connect to the fuselage 16 by means of quick disconnect couplings 64. The quick disconnect couplings 64 permit the fuel lines 62 to be disconnected when the pylon 32 is removed.

Electrical controls, such as fuel control logic, are routed along lines 66 from the tanker aircraft 10 to the refueling pod 34 through the pylon 32. The electrical controls permit personnel and/or signal processors on the tanker aircraft to monitor the refueling process for controlling the operating state of the aircraft and the fuel mechanisms. For example, signals may be sent to the tanker cockpit indicating whether or not the refueling probe on the receiver aircraft 26 is engaged with the drogue and whether or not fuel is being transferred. Visual control 68 may also be incorporated into the refueling system by mounting a video camera within or upon the refueling pod 34. This provides personnel in the tanker with visual formation as to the refueling status. All the controls are preferably attached to the fuselage 16 by means of quick disconnect couplings 70 which permit the lines to be decoupled when the pylon is removed.

In the preferred embodiment, the refueling system 30 is removably mounted to the fuselage 16 by means of mounting lugs 72. The pylon 32 has lugs formed on it which mate with corresponding lugs mounted on the fuselage 16. The fuselage mounts are preferably adjacent to the fuselage floor, thereby providing structural support for reacting the refueling system loads. The fuselage floor may be reinforced or replaced between the pylon mounts with a sandwich type structure 74, such as honeycomb panels, to accommodate the increased loads. Additionally, the refueling pod 34 is preferably removably attached to the pylon 34 by lugs 76. Accordingly, the refueling pod can be removed and replaced if damaged or if a longer refueling hose is required. Moreover, the capability of the refueling pod 34 to be removed permits the symmetric pylon 32 to be interchanged on either side of the fuselage 16, as discussed above.

It should be appreciated that the position and configuration of the refueling system 30 results in reduced loads being imposed on the fuselage 16. That is, by locating the pod 34 substantially closer to the fuselage 16 as compared to existing wing-mounted refueling systems, a reduced moment load is applied to the fuselage 16. Accordingly, the reduced loading on the fuselage 16 results in reduced fatigue and increased operational life of the aircraft 10. Additionally, the pylon is mounted at a point on the fuselage (i.e., aft of the main wing and forward of the empennage) where the floors are lightly loaded during normal flight and, therefore, do not need substantial reinforcement to carry the refueling loads. Conversely, the loads induced by the wing-mounted refueling pods must be reacted by the main wing attachment to the fuselage, which is already subjected to high loading.

As discussed above, the refueling system 30 is removably attached to the fuselage and, therefore, can be completely detached from the tanker aircraft 10 when no aerial refueling of receiver aircraft is contemplated. This ability to remove the refueling system 30 from the tanker aircraft 10 results in less drag and fatigue on the tanker aircraft 10 which, in turn, corresponds to an increased overall life.

As stated above, and referring to FIGS. 6a–6c, the pylon 32 is mounted aft of the main wing 12 and, preferably, forward of and below the horizontal stabilizer 14. This mounting location, in combination with the angular orientation of the exit port 40, permits the extended refueling hose 42 and drogue 50 to follow a path as shown in the figures. FIG. 6c illustrates the profile of the refueling hose when the tanker aircraft is flying above 285 KIAS (Knots Indicated Air Speed). As can be seen, the refueling hose 42 is positioned away from the tanker aircraft fuselage 16 and control surfaces 12, 14. When the tanker aircraft 10 is flying below 285 KIAS, the refueling hose follows the profile identified by numeral 42'.

FIGS. 6a and 6b show a receiver aircraft 26 with its refueling probe $26_A$ attached to the drogue 50. The operational envelopes for the refueling system when the tanker aircraft 10 is flying above and below 285 KIAS are depicted by numerals 52 and 52', respectively. As should be evident from the figures, the configuration of the refueling system (e.g., mounting location, exit port orientation, pylon shape, etc.) provides a large envelope in which the receiver aircraft 26 can refuel without contacting the tanker aircraft fuselage 16 or control surfaces 12, 14. Furthermore, the configuration of the refueling system 30 maintains the receiver aircraft 26 at a location which is away from the wing tip vortices 29 and engine exhaust flows 28. Hence, the receiver aircraft 26 can safely and efficiently attach to and receive fuel from the refueling drogue 50 without being subjected to turbulent and disruptive air flows.

Figures 7A, 7B:
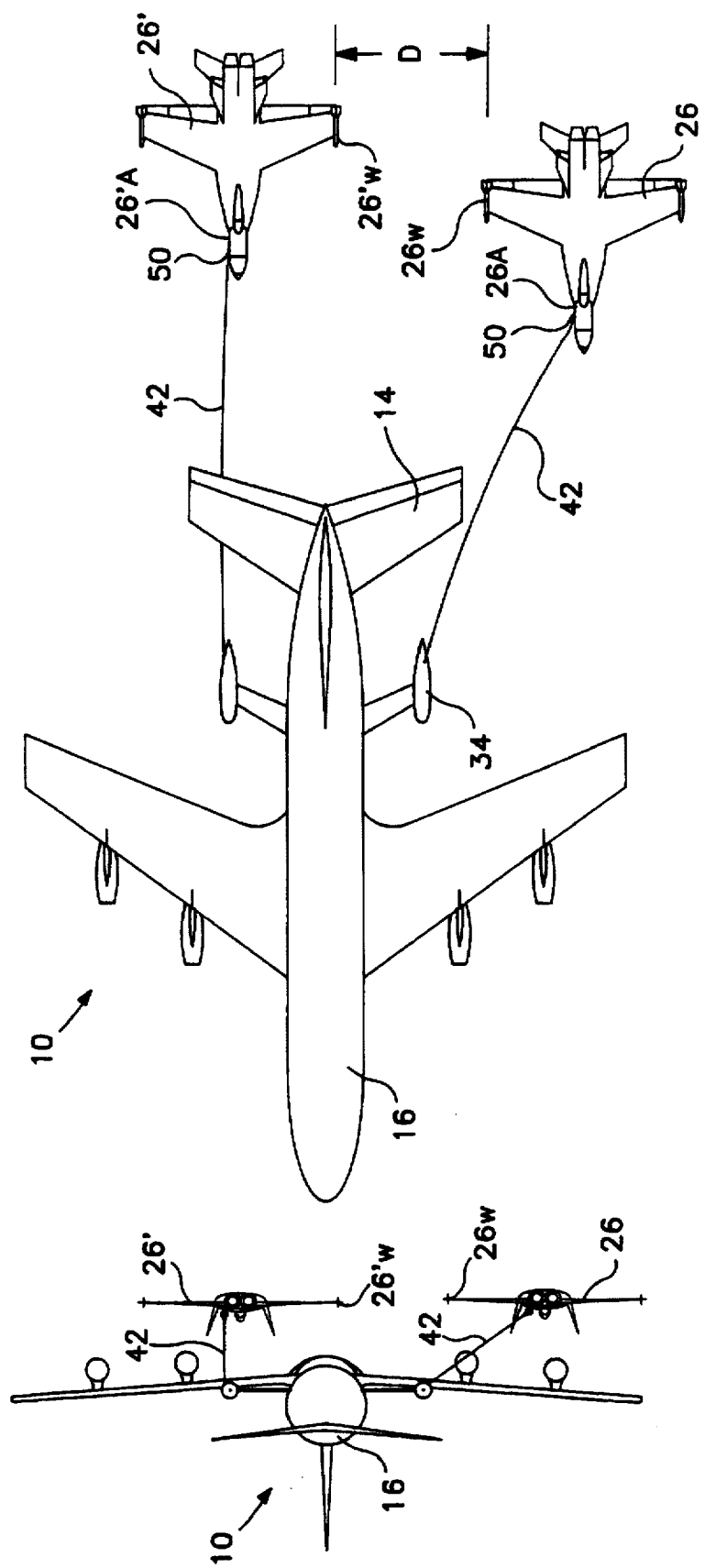
FIG. 7a is a rear view of the refueling system of the present invention during a multi-aircraft refueling operation with one receiver aircraft engaged with a refueling hose and a second receiver aircraft attempting to engage with a refueling hose.
FIG. 7b is a top view of the refueling system of the present invention during a multi-aircraft refueling operation with one receiver aircraft engaged with a refueling hose and a second receiver aircraft attempting to engage with a refueling hose.
Figure 8B:
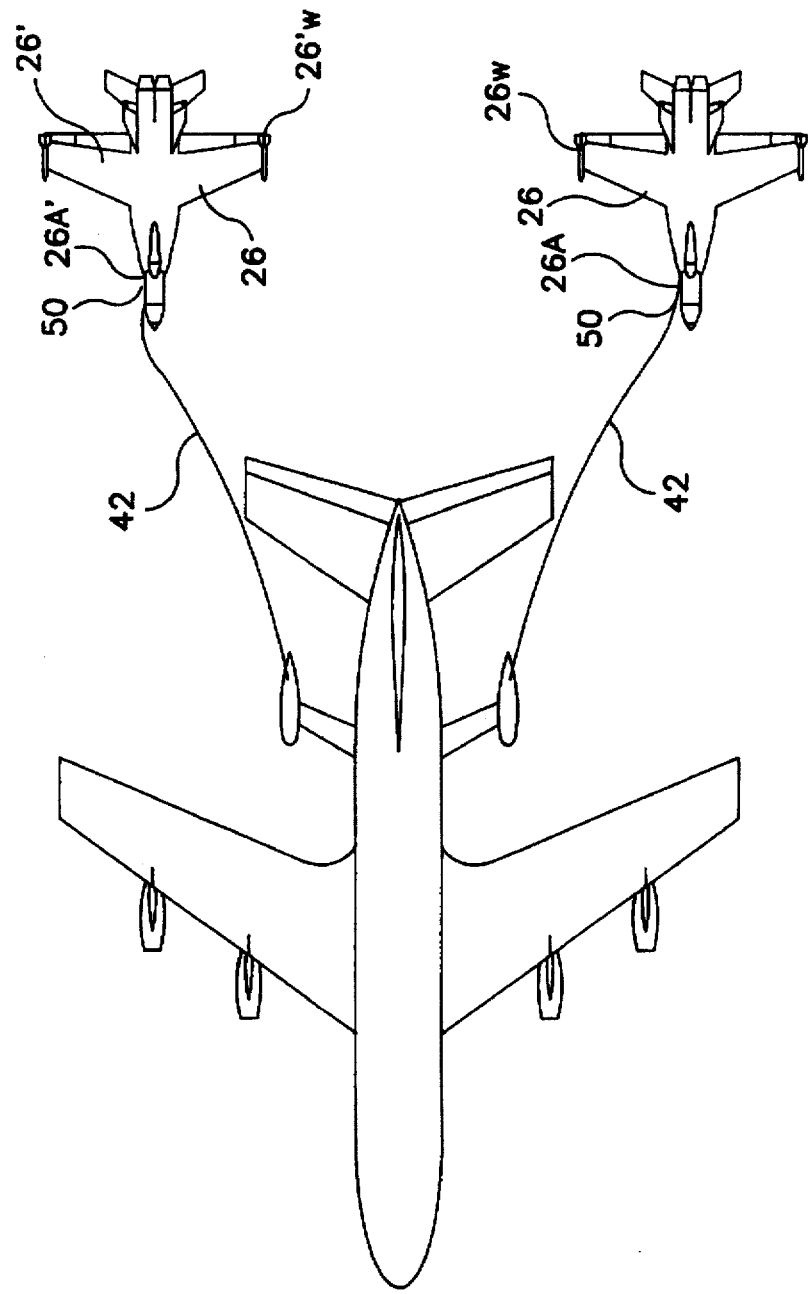
FIG. 8b is a top view of the refueling system of the present invention during a multi-aircraft refueling operation with two receiver aircraft each engaged with a refueling hose.
Figure 8A:
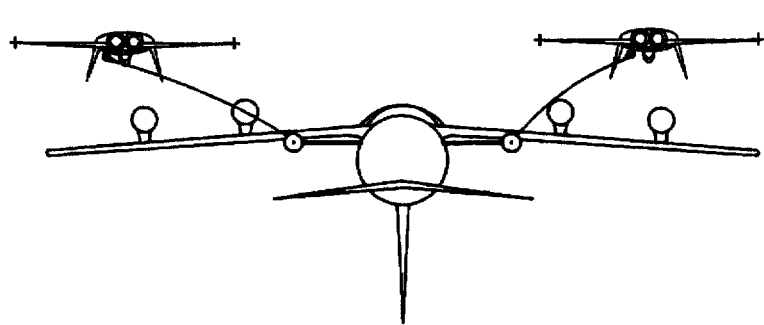
FIG. 8a is a rear view of the refueling system of the present invention during a multi-aircraft refueling operation with two receiver aircraft each engaged with a refueling hose.

FIGS. 6 through 8 depict a typical multi-aircraft refueling operation. A first receiver aircraft 26 approaches one of the refueling hoses 42 which trails behind the tanker aircraft 10. The first receiver aircraft 26 engages its refueling probe $26_A$ with the drogue 50 as shown in FIG. 6b. The first receiver aircraft 26 then, while maintaining engagement of the refueling probe $26_A$ and drogue 50, moves away from the other trailing refueling hose to permit the second receiver aircraft 26' to engage its refueling probe $26_A$' with the drogue 50 as shown in FIGS. 7a and 7b. The trajectory of the refueling hose 42 is configured so as to position the wing tip $26_w$ of the first receiver aircraft 26 at a distance D from the wing tip $26_w$' of the second receiver aircraft 26' when the second receiver aircraft 26' is attempting to engage with the drogue 50. Referring to FIGS. 8a and 8b, after engaging with the drogue 50, the second receiver aircraft 26' transitions away from the first receiver aircraft 26 in order to minimize any likelihood of contact.

Figure 9A:
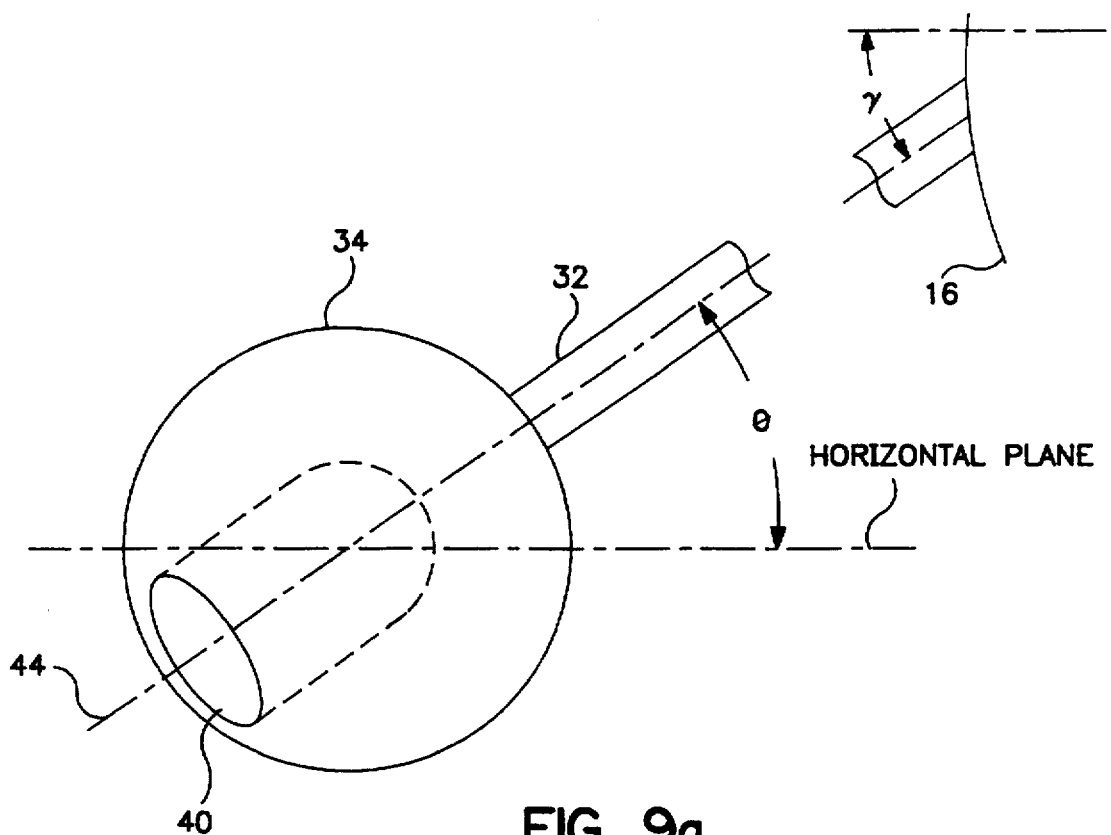
FIG. 9a is a rear view of an alternate embodiment of the refueling system of the present invention illustrating the position of the exit port of a refueling pod when mounted on a pylon with a negative dihedral.

The preferred embodiment of the invention has been disclosed as mounted on a KC-135R tanker aircraft. However, alternate embodiments are well within the scope of this invention. For example, when the refueling system of the present invention is mounted on an L-1011 tanker aircraft, the aircraft configuration requires that the pylon 32 be mounted to the fuselage 16 at a negative dihedral angle γ with respect to the horizontal axis of the fuselage of about 30 degrees as is shown in FIG. 9a. Accordingly, in order to maintain the preferred angle β of the exit port 40 at about 30 degrees to the horizontal, the refueling pod 34 is attached to the pylon 32 such that the centerline of the pylon and the desired plane 44 are approximately co-linear.

Furthermore, in the L-1011 aircraft mounted refueling system it is preferable that the aft sweep angle α of the pylon 32 be approximately 33 degrees and that the width (leading edge to trailing edge) and thickness of the pylon 32 be about 69 inches and about 6.9 inches, respectively. The NACA 0010-35 airfoil is the preferred airfoil for its symmetric configuration. The pylon 32 preferably extends outward approximately seven feet from the side of the fuselage 16.

Figure 9B:
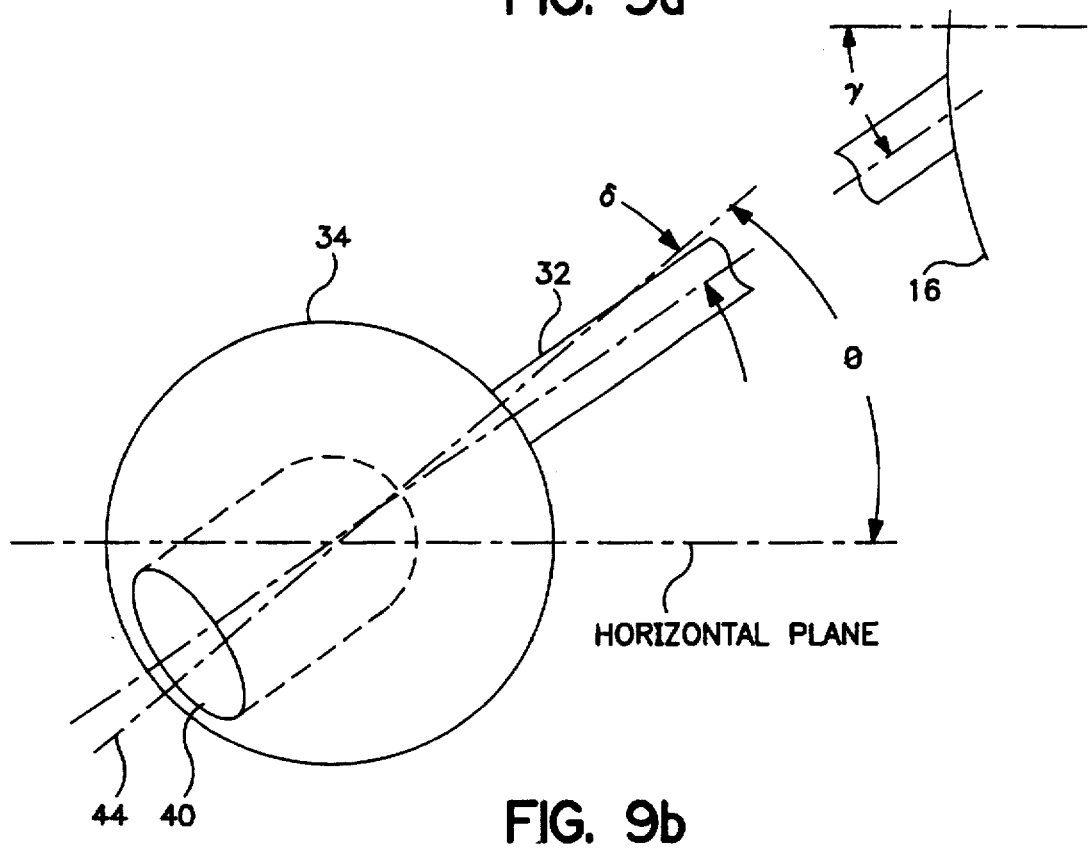
FIG. 9b is a rear view of another embodiment of the refueling system of the present invention illustrating the position of the exit port of a refueling pod when mounted on a pylon with a negative dihedral.

In another embodiment of the present invention mounted on a DC-10 tanker aircraft, the aircraft configuration requires that the pylon 32 be mounted to the fuselage 16 at a negative dihedral angle γ with respect to the horizontal axis of the fuselage of about 26 degrees as is shown in FIG. 9b. Accordingly, in order to maintain the preferred angle β of the exit port 40 at about 30 degrees, the refueling pod 34 is attached to the pylon 32 at an angle δ of about 4 degrees with respect to the centerline of the pylon.

Furthermore, in the DC-10 aircraft mounted refueling system it is preferable that the aft sweep α of the pylon be approximately 33 degrees and that the width (leading edge to trailing edge) and thickness of the pylon be about 69 inches and about 6.9 inches, respectively. The NACA 0010-35 airfoil is once again chosen as the preferable airfoil for its symmetric configuration. The pylon preferably extends outward approximately seven feet from the side of the aircraft.

Although the invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed:

1. A refueling system for an aircraft, the aircraft having a fuselage, a main wing extending from opposite sides of the fuselage, a stabilizer extending from opposite sides of the fuselage aft of the main wing, and a fuel source disposed within the aircraft, the refueling system comprising:

at least one pylon extending from a side of the fuselage at a position aft of the main wing and forward of the stabilizer;

said pylon having a refueling pod mounted thereon outboard of the fuselage;

a refueling hose disposed within and extendable from the at least one pod; and means for transferring fuel from the fuel source to the refueling hose.

2. A refueling system for an aircraft, the aircraft having a fuselage, a main wing extending from opposite sides of the fuselage, a stabilizer extending from opposite sides of the fuselage aft of the main wing, and a fuel source disposed within the aircraft, the refueling system comprising:

two pylons disposed on opposite sides of the fuselage, the pylons being positioned aft of the main wing and forward of the stabilizer;

each pylon having a refueling pod mounted thereon outboard of the fuselage;

a refueling hose disposed within and extendable from each pod; and means for transferring fuel from the fuel source to the refueling hose.

3. The refueling system according to claim 1 wherein the pylon and the pod have aerodynamic shapes.

4. The refueling system according to claim 3 wherein the aerodynamic shape of the pylon is symmetric for providing interchangeability between opposite sides of the aircraft.

5. The refueling system according to claim 3 wherein the pylon has a leading edge and a trailing edge, and wherein the leading edge has an aft sweep in a range between about 0 degrees and about 80 degrees.

6. The refueling system according to claim 5 wherein the leading edge of the pylon has an aft sweep in a range between about 20 degrees and about 45 degrees.

7. The refueling system according to claim 6 wherein the leading edge of the pylon has an aft sweep of about 34 degrees.

8. The refueling system according to claim 1 further comprising an exit port formed in the refueling pod for channeling the refueling hose during extension in a prescribed direction.

9. The refueling system according to claim 8 wherein the refueling pod has a longitudinal axis and the refueling hose is channeled at an angle with respect to said longitudinal axis of the refueling pod.

10. The refueling system according to claim 9 wherein the refueling hose is channeled at a angle of between about 0 degrees and about 90 degrees with respect to the longitudinal axis of the refueling pod.

11. The refueling system according to claim 10 wherein the refueling hose is channeled at a angle of between about 5 degrees and about 30 degrees with respect to the longitudinal axis of the refueling pod.

12. The refueling system according to claim 11 wherein the refueling hose is channeled at an angle of about 15 degrees with respect to the longitudinal axis of the refueling pod.

13. The refueling system according to claim 8 wherein the refueling hose is channeled along a plane extending laterally from the refueling pod and at an angle to a horizontal plane.

14. The refueling system according to claim 13 wherein the refueling hose is channeled along a plane at an angle of between about 0 degrees and about 90 degrees to the horizontal plane.

15. The refueling system according to claim 14 wherein the refueling hose is channeled along a plane at an angle of between about 10 degrees and about 40 degrees to the horizontal plane.

16. The refueling system according to claim 15 wherein the refueling hose is channeled along a plane at an angle of about 30 degrees to the horizontal plane.

17. The refueling system according to claim 1 wherein at least a portion of the pylon forms a dihedral angle with respect to a horizontal plane.

18. The refueling system according to claim 1 wherein the pylon is mounted to the fuselage at a dihedral angle to a horizontal plane.

19. A refueling system for an aircraft, the aircraft having a fuselage, a main wing extending from opposite sides of the fuselage, a stabilizer extending from opposite sides of the fuselage aft of the main wing, and an fuel source disposed within the aircraft, the refueling system comprising:

at least one pylon extending from the fuselage at a position aft of the main wing and at an angle to a horizontal plane between about 20 degrees and about 40 degrees;

said pylon having a refueling pod mounted thereon outboard of the fuselage;

a refueling hose disposed within and extendable from the at least one pod; and means for transferring fuel from the fuel source to the refueling hose.

20. The refueling system according to claim 19 wherein the angle with respect to the horizontal that the pylon is mounted is between about 26 degrees and about 30 degrees.

21. An aircraft capable of dispensing fuel in-flight, the aircraft comprising:

a fuselage;

a main wing extending from opposite sides of the fuselage;

an empennage mounted aft of the main wing and extending from opposite sides of the fuselage;

at least one aerodynamic pylon extending laterally from the side of the fuselage, the pylon being mounted aft of the main wing and forward of the empennage;

a refueling pod mounted on the pylon and having a refueling hose disposed in and extendable from the refueling pod;

a fuel source located within the aircraft;

means for transferring fuel from the fuel source to the refueling hose; and means for supporting the pylon on the fuselage.

22. The aircraft according to claim 21 wherein the means for supporting the pylon includes a reinforced floor mounted within the fuselage, aft of the main wing and forward of the empennage, and mounting lugs extending out of the fuselage, and wherein the pylon has corresponding mounting lugs affixed to the pylon which mate with the mounting lugs extending from the fuselage.

23. An aircraft capable of dispensing fuel in-flight, the aircraft comprising:

a fuselage;

a main wing extending from opposite sides of the fuselage;

an empennage mounted aft of the main wing and extending from opposite sides of the fuselage;

two aerodynamic pylons mounted on opposite sides of the fuselage, the pylons being mounted aft of the main wing;

a refueling pod mounted on each pylon and having a refueling hose disposed in and extendable from the refueling pod;

a fuel source located within the aircraft;

means for transferring fuel from the fuel source to the refueling hose; and means for supporting each pylon on the fuselage including a reinforced floor mounted within the fuselage, aft of the main wing and forward of the empennage, the reinforced floor extending between the two pylons and comprising sandwich type structure, and mounting lugs extending out of the fuselage, and wherein the pylon has corresponding mounting lugs affixed to the pylon which mate with the mounting lugs extending from the fuselage.

24. A refueling system for an aircraft, the aircraft having a fuselage, a main wing extending from opposite sides of the fuselage at a forward location, a stabilizer extending from opposite sides of the fuselage aft of the main wing, and a fuel source disposed within the aircraft, the refueling system comprising:

two aerodynamic pylons extending from opposite sides of the fuselage at a position aft of the main wing and forward of the stabilizer, the pylons having an aft sweep;

a pod mounted to the outboard end of each pylon, the pod including a refueling hose disposed within and extendable from each pod, and an exit port for channeling the refueling hose in a predetermined direction away from the aircraft fuselage; and means for transferring fuel from the fuel source to the refueling hose.

25. A refueling system for an aircraft, the aircraft having a fuselage, a main wing extending from opposite sides of the fuselage, a stabilizer extending from opposite sides of the fuselage aft of the main wing, and a fuel source disposed within the aircraft, the refueling system comprising:

two pylons extending from the fuselage at a position aft of the main wing and forward of the horizontal stabilizer, the pylons having a configuration which minimizes drag and lift;

means for directing a refueling hose in a predetermined direction, said directing means being attached to one of the pylons, the refueling hose being extendable out of and retractable into said directing means;

means for transferring fuel from the fuel source to the refueling hose; and means for monitoring and controlling the transferring of fuel.

26. The refueling system according to claim 4 wherein the symmetric airfoil of the pylon is a NACA 0010-35 airfoil.

* * * * *